Aug. 25, 1931.  W. D. SARGENT  1,820,711
VEHICLE WHEEL
Filed Oct. 15, 1928
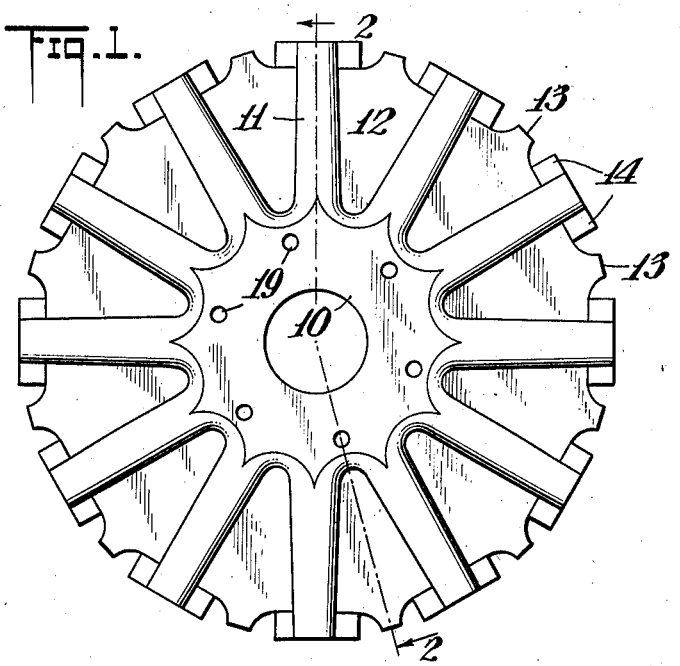
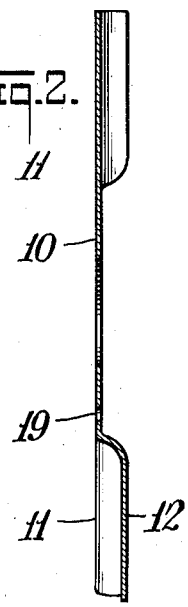
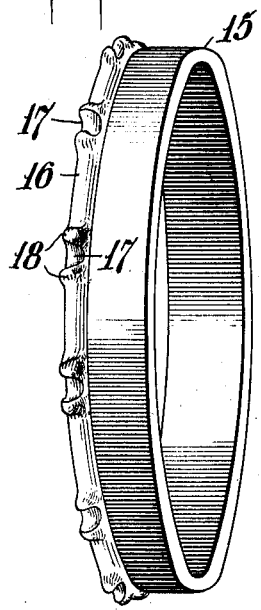
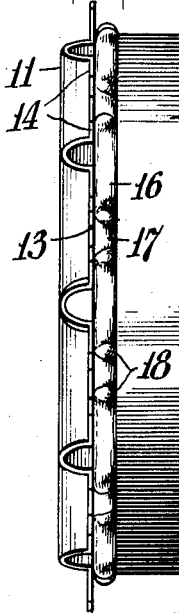
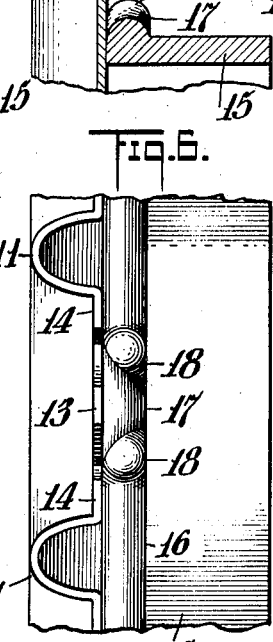
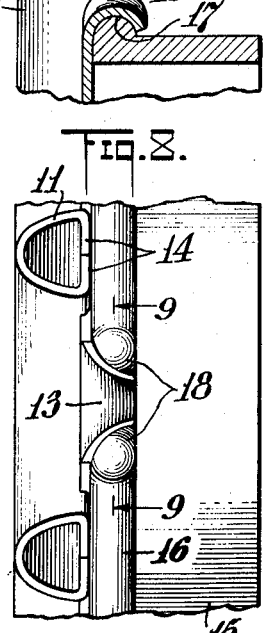
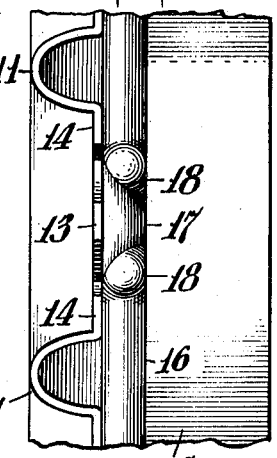
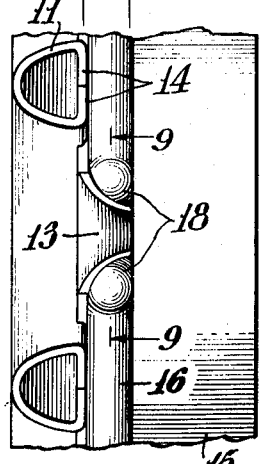
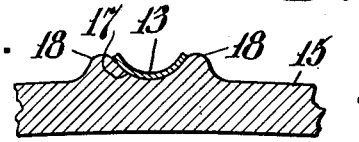
INVENTOR
William D. Sargent
BY
ATTORNEY Patented Aug. 25, 1931

1,820,711

UNITED STATES PATENT OFFICE

WILLIAM D. SARGENT, OF WEST ORANGE, NEW JERSEY

VEHICLE WHEEL

Application filed October 15, 1928. Serial No. 312,566.

This invention relates to vehicle wheels of the type in which there is employed a brake flange. In the usual type of construction the brake flange is made integral with a supporting web, the two together constituting a brake drum, and the web is detachably secured to the body of the wheel. In my invention the brake flange is made separate from and attached to the body of the wheel or other supporting parts.

The brake flange should be of dense, granular structure and of absolute uniformity as to material. It should offer high resistance to abrasion, resistance to growth, and resistance to change of structure or physical characteristics under the influence of heat. It should also have great rigidity.

Brake drums have heretofore been made with a flange and a supporting web in one piece from either hard or soft rolled, forged or pressed steel, from cast steel and from gun iron. None of these materials satisfactorily fill the requirements of a brake flange. Soft rolled steel is fibrous rather than granular, abrades easily, is subject to changes in structure by heating and rapid cooling, that is it acquires temper or hardening in spots, and it does not have sufficient rigidity. Hard rolled steel is more satisfactory, but is fibrous rather than granular and may or may not be dense depending upon treatment during manufacture. Because of its lack of granular structure it does not have the desired rigidity. In making a brake flange of cast steel it is practically impossible to get the same uniformity of structure because of the different rates of cooling at different parts of the casting, and the grain is not as dense as that of iron. Gun iron is not of absolute uniformity, does not offer sufficient resistance to growth, and its structure is changed under the influence of heat.

In carrying out my invention I make the brake flange separate from the supporting web or other supporting part. For the supporting part I employ a malleable metal and for the brake flange a material which is strong, dense, and more resistant to abrasion than the supporting part and substantially non-malleable. The brake flange is preferably a resistant, granular, cast iron and the best material I know of is pearlite iron which includes both a substantially pearlitic matrix and a uniform distribution and size of graphite and grain size. Tests of such material show a tensile strength of 41,000 pounds per square inch, transverse strength of 74,000 pounds per square inch, and deflection of 0.416 inches between 24 inch supports. This material offers very great resistance to wear, one reason being that the carbon content is much higher than that of steel and the pearlitic structure is much more resistant than the ⅓ pearlitic and ⅔ ferric structure of steel.

Although certain properties of this material have heretofore been known, the advantages of a brake flange made of this material and separate from the supporting web have not been appreciated or suggested.

My improved brake flange requires no machining or finishing operations other than the grinding of the surface or surfaces which engage the brake mechanism. It may be made in a small number of standard sizes which may be used in making up a very large number of kinds, sizes and types of wheels.

As one important feature, my improved brake flange is made with a surface so designed that malleable portions of the supporting structure may be bent or forced into interlocking engagement therewith to permanently and rigidly connect it to a web, the body of the wheel structure, or other supporting part.

As a further important feature I permanently attach the brake flange to the supporting portion of the wheel by forcing malleable portions of the latter into engagement with the brake flange during the manufacture of the wheel so that absolute centering and alignment of the brake flange is secured, and the brake flange positively locked against radial, axial or circumferential movement.

The portion of the wheel which supports the brake flange may be of sheet steel, cast steel, or cast malleable iron, and is provided with lugs for engaging the brake flange, whereby during the assembly the lugs are so bent that they have a claw-like grip on the brake flange and thus permanently connect the parts.

So far as concerns this feature of my invention the brake flange supporting web may be the body of the wheel, or an adapter or flange bolted, welded or otherwise secured to the body of the wheel or to the hub.

By means of my invention, the brake flange is not only permanently, accurately and rigidly secured in place, but this is done by a die operation without the necessity for bolts, rivets or other separate connecting members which are liable to loosen or shear and which do not insure absolute concentricity of the wheel and brake drum.

As a further feature of my invention the body of the wheel is made of sheet steel or malleable iron or steel, and includes radial corrugations serving as spokes, brake flange gripping lugs, and substantially tubular or U-shaped spoke ends which may be permanently connected to a felly or detachably connected to a rim.

As a further feature the wheel body and the brake flange are supported by a single mandrel or by concentric mandrels during the operation of bending the lugs and locking the parts together. Thus accuracy in assembly is secured.

In the accompanying drawings I have illustrated one embodiment of my invention although it will be apparent that various changes may be made in the details of construction within the scope of the appended claims and without departing from the spirit of my invention.

In the drawings:

Fig. 1 is a face view of the blank for forming the body of the wheel, as it is die cast or after certain stamping operations on a flat sheet;

Fig. 2 is a section on the line 2—2 of Fig. 1;

Fig. 3 is a perspective view of the brake flange;

Fig. 4 is an edge view of the wheel with the brake flange in place, but before being attached;

Fig. 5 is a sectional detail of the parts shown in Fig. 4;

Fig. 6 is a view similar to a portion of Fig. 4, but on a larger scale;

Fig. 7 is a view similar to Fig. 5, but showing the flange secured in place;

Fig. 8 is a view similar to Fig. 6 with the flange attached and the spokes completed; and Fig. 9 is a sectional detail on the line 9—9 of Fig. 8.

In the construction illustrated the body of the wheel is formed of a single piece of malleable metal which may be cast in or bent to the desired form. The partially completed blank as shown in Figs. 1 and 2 includes an annular center portion 10 which may be of any desired form. It is shown flat and provided with apertures, whereby it may be bolted or riveted to a wheel hub, although within the broad scope of my invention this center portion may be bent or cast to form the body of the hub itself. Outside of this center portion 10 there are formed a series of radial corrugations 11 which serve as spokes and are connected by intermediate web portions 12.

At the periphery the blank is formed with recesses or slots so as to provide lugs, flanges or extensions 13 on the web portions 12, and lateral lugs or extensions 14 at opposite sides of each spoke 11. The distance of the inner ends of the lugs 13 from the center of the wheel may be varied depending upon the diameter of the brake flange which is employed, and the length and shape of these lugs may be varied depending upon the specific design of the brake flange.

The brake flange 15 as shown in Fig. 3 is a granular iron casting which preferably includes a substantially pearlitic matrix and a uniform distribution and size of graphite and of grain sizes. The casting is in the form of an annulus with means along one edge thereof for interlocking engagement with the lugs 13. It may, if desired, have a bead or reinforcing flange 16 along one edge thereof. For an internally working brake this bead is preferably upon the outer periphery of the brake flange, whereas for an externally working brake it might be upon the inner surface. The means on the brake flange for said interlocking engagement of the malleable supporting and retaining parts, are preferably on the bead 16 or are in the form of spaced recesses or projections along the length thereof. Preferably there are recesses 17 and ridges or projections 18 at each side of each recess.

The lugs 13 are preferably tapered as shown in Fig. 1, and the recesses 17 are correspondingly tapered, that is they are wider at the extreme edge of the brake flange and become narrower at the opposite side of the bead. Also they are convexly curved in a direction transverse to the brake flange and concave in a direction circumferentially of the brake flange.

When the blank has been formed as shown in Figs. 1 and 2 it is secured to a mandrel by bolting or otherwise engaging the holes 19 in the center portion 10, and the brake flange is supported on the same mandrel or on another and concentric one in the position shown in Fig. 4. Then by means of suitable dies the several flanges or lugs 13 are caused to conform exactly to their respective recesses. Each lug is thus wrapped around a convex projecting part of the brake flange and is made substantially concave along the major portion of its length so it will seat against the ridges or projections 18. This curving of the lugs in two directions greatly strengthens and stiffens the lugs, and the curving up of the lateral edges of the lugs gives greatly increased surface contact for resisting braking strains on the brake flange. A similar effect may be secured by wrapping the lug around a convex projection so that the lug is curved convexly in two directions.

In some constructions the terminal portions of the spokes may be U-shaped in cross-section, and in that event the lugs or flanges 14 will be omitted in forming the body of the wheel. If it is desired that these terminal portions or spoke ends be tubular, the flanges or extensions 14 are employed, and they are bent around from the position shown in Fig. 6 to the position shown in Fig. 8.

The tire may be secured to the ends of the spokes by any well known means which forms no portion of my invention and therefore has not been illustrated. A felly may be secured to the spoke ends and carry a detachable rim, or if the body of the wheel be cast of malleable metal, the felly may be cast integral therewith. The felly may be omitted and the spoke ends may be provided with rim clamping means for directly supporting and securing the detachable rim.

By the term "malleable supporting part" as applying to the part to which the brake flange is secured, I do not restrict myself to the construction in which such part is an integral part of the body of the wheel. Such supporting part may be an adapter, or an annular web, or other part bolted, riveted, welded or otherwise permanently or detachably secured to the body of the wheel. This annular part may be connected as above described to the brake flange so that the brake drum comprising such brake flange and support may be sold as a separate article of manufacture.

So far as concerns the method and specific means for connecting the brake flange and support, it will be apparent that the brake flange need not be either pearlitic iron or even cast iron, but may be of any suitable hard dense resistant metal suitable for brake flange use.

A great advantage of my construction is the strengthening effect which I secure upon the wheel structure. The brake flange acts as a strengthening member especially against impact, but also by tying the spokes together promotes greatly the strength of the structure as a unit. The brake flange being of substantially nonmalleable metal prevents bending of the malleable wheel.

Having thus described my invention, what I claim as new and desire to secure by Letters Patent is:

1. A vehicle wheel having a malleable metal portion presenting a series of lugs, and a brake flange juxtaposed thereto, said lugs being bent into interlocking engagement with said flange and serving as the sole means to prevent relative circumferential, radial or axial movement.

2. A vehicle wheel having a brake flange provided with a bead having recesses therein, and a wheel body having malleable lugs bent into interlocking engagement with said flange in said recesses and serving as the sole means to prevent relative movement of said brake flange in respect to the wheel.

3. A vehicle wheel having a body portion formed of malleable metal and presenting radial corrugations serving as spokes and intermediate web portions, said web portions presenting lugs, and a brake flange having interlocking engagement with said lugs.

4. A vehicle wheel having a body portion formed of malleable metal and presenting radial corrugations serving as spokes and intermediate web portions, said web portions presenting lugs, and a brake flange having recesses therein, said lugs being bent into interlocking engagement in said recesses to retain the brake flange in position.

5. A vehicle wheel having a body portion formed of malleable metal and presenting radial corrugations serving as spokes and intermediate web portions, said web portions presenting lugs, and a brake flange having recesses tapered and convexly curved transversely of the brake flange and concavely curved circumferentially thereof, said lugs being bent into interlocking engagement in said recesses to follow the contour thereof and thus retain the brake flange in position.

6. A vehicle wheel having a body portion formed of malleable metal presenting lugs, and a brake flange having recesses tapered and convexly curved transversely of the brake flange and concavely curved circumferentially thereof, said lugs being bent into interlocking engagement in said recesses to follow the contour thereof and serve as the sole means for retaining the brake flange in position.

7. A vehicle wheel having a body portion formed of malleable metal and presenting radial corrugations serving as spokes and intermediate web portions, said web portions presenting lugs, and a cast iron brake flange of cylindrical form having parts integral therewith projecting from one cylindrical surface and curved transversely and circumferentially of the flange, said lugs being bent into interlocking engagement with said curved parts, to lock the brake flange against axial, radial or circumferential movement in respect to the body portion of the wheel.

8. A vehicle wheel having a body portion formed of malleable metal and presenting radial spokes serving as corrugations and intermediate web portions, the outer ends of the corrugations beyond the outer edge of the web portions presenting lateral extensions bent toward each other to make the terminal portions of the spokes substantially tubular, and a brake flange adjacent to the outer edge of the web portions and secured thereto solely by interlocking parts of said flange and web portions.

9. A vehicle wheel having a body portion presenting radial corrugations and intermediate web portions, the web portions being provided with lugs, and the outer ends of the corrugations also presenting lugs, the last mentioned lugs being bent to form substantially tubular spoke ends, and a brake flange having interlocking engagement with the first mentioned lugs.

Signed at New York in the county of New York and State of New York this 11th day of October A. D. 1928.

WILLIAM D. SARGENT.